United States Patent
Ishikawa et al.

(10) Patent No.: US 6,851,766 B2
(45) Date of Patent: Feb. 8, 2005

(54) TRACTION CONTROL APPARATUS FOR VEHICLE

(75) Inventors: Toshimi Ishikawa, Anjo (JP); Zensaku Murakami, Susono (JP); Noritaka Yamada, Mishima (JP)

(73) Assignees: Advics Co., Ltd., Kariya (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/653,935

(22) Filed: Sep. 4, 2003

(65) Prior Publication Data

US 2004/0041469 A1 Mar. 4, 2004

(30) Foreign Application Priority Data

Sep. 4, 2002 (JP) ......................................... 2002-258614

(51) Int. Cl.$^7$ ................................................. B60T 8/00
(52) U.S. Cl. ...................................... 303/139; 303/196
(58) Field of Search ................................. 303/139, 196, 303/149, 195

(56) References Cited

U.S. PATENT DOCUMENTS

| | | | | |
|---|---|---|---|---|
| 4,066,300 A | * | 1/1978 | Devlin .......................... 303/139 |
| 4,823,269 A | * | 4/1989 | Fujioka et al. .................. 701/90 |
| 4,873,638 A | * | 10/1989 | Shiraishi et al. ............... 701/70 |
| 5,117,934 A | * | 6/1992 | Tsuyama et al. ............. 180/197 |
| 5,325,300 A | * | 6/1994 | Tsuyama et al. ............... 701/90 |
| 5,429,428 A | * | 7/1995 | Yasuda ......................... 303/139 |
| 5,628,378 A | * | 5/1997 | Saito et al. ................... 180/197 |
| 5,850,616 A | | 12/1998 | Matsuno et al. |
| 5,865,512 A | * | 2/1999 | Meiser et al. ................ 303/139 |
| 5,980,000 A | * | 11/1999 | Kolbe et al. .................. 303/139 |
| 6,007,454 A | * | 12/1999 | Takahira et al. ............... 477/92 |
| 6,023,650 A | * | 2/2000 | Yamamoto et al. ........... 701/82 |
| 6,244,673 B1 | * | 6/2001 | Konrad et al. ............... 303/142 |
| 6,269,297 B1 | | 7/2001 | Hosomi et al. |
| 6,367,894 B1 | | 4/2002 | Mergenthaler |
| 6,591,178 B2 | * | 7/2003 | Krueger et al. ............... 701/83 |

FOREIGN PATENT DOCUMENTS

| | | |
|---|---|---|
| EP | 0 508 640 A1 | 10/1992 |
| EP | 0 550 997 A1 | 7/1993 |
| JP | 2000-344083 | 12/2000 |

* cited by examiner

*Primary Examiner*—Matthew C. Graham
(74) *Attorney, Agent, or Firm*—Burns, Doane, Swecker & Mathis, L.L.P.

(57) ABSTRACT

A traction control apparatus for a vehicle sets an allowable slip ratio to a constant value that is rather great, when the shift position of a sub-transmission is in "H4", or the shift position of the sub-transmission is in "L4" and the difference between the maximum value and the minimum value among wheel speeds of each driving wheel is less than a wheel speed difference threshold value. On the other hand, when the shift position of the sub-transmission is in "L4" and the difference is not less than the wheel speed difference threshold value, the traction control apparatus for the vehicle of the present invention sets the allowable slip ratio to a constant value that is smaller than the above-mentioned constant value. In case where the slip ratio of each driving wheel exceeds the allowable slip ratio set as described above, predetermined braking force is exerted on each driving wheel so as to place the slip ratio of each driving wheel within the allowable slip ratio.

10 Claims, 4 Drawing Sheets

TRACTION CONTROL APPARATUS FOR VEHICLE

BACKGROUND OF THE INVENTION

1. Field of the Invention

The present invention relates to a traction control apparatus for vehicles that exerts braking force on each driving wheel so as not to excessively increase a slip amount of each driving wheel, when a vehicle is in the state to be driven.

2. Description of the Prior Arts

A traction control apparatus has conventionally been known that exerts braking force on each driving wheel so as to place a slip amount of each driving wheel within an allowable slip amount for keeping satisfactory running through performance and running stability, in case where a vehicle is in the state to be driven and the slip amount of each driving wheel exceeds the allowable slip amount. This allowable slip amount is desirably set to a suitable amount for effectively transmitting driving force to a vehicle body according to a state of a road surface on which a vehicle runs.

In case where a vehicle travels on a normal paved road (hereinafter referred to as "on-road"), a friction force between a tire of each driving wheel and a road surface becomes uniform to thereby make a slip amount of each driving wheel approximately same, since a road holding per each wheel is satisfactory and uniform. In other words, a difference in wheel speeds among each of the driving wheels is maintained low when each driving wheel is slipped. It has been found in this case that setting the allowable slip amount to a relatively great value so as to uniformly produce a relatively great slip on each driving wheel can effectively transmit driving force to a vehicle body.

On the other hand, when a vehicle travels on an unpaved road (hereinafter referred to as "off-road"), the road holding of the wheel is frequently poor so that a part of the driving wheels frequently separates from the road surface. Therefore, a part of the driving force from a driving source is used (consumed) for causing a slip of a driving wheel that is not grounded due to operation of a differential gear. As a result, the driving force is hard to be transmitted to the grounded driving wheel that can transmit the driving force to the vehicle body. In other words, the driving force is hard to be effectively transmitted to the vehicle body with a state where a difference in wheel speeds among each driving wheel becomes large when each driving wheel is slipped.

In this case, setting the allowable slip amount to a rather small value exerts braking force on the driving wheel a little earlier after the driving wheel that is not grounded starts to slip, whereby great driving force is transmitted due to the operation of the differential gear to the grounded driving wheel according to a degree that the slip amount (wheel speed) of the driving wheel that is not grounded is limited small. Consequently, the driving force is effectively transmitted to the vehicle body, and hence, satisfactory running through performance can be maintained. As understood from the above, it is generally preferable that the allowable slip amount is set rather small in the off-road travel situation compared to that in the on-road travel situation.

In case where a vehicle travels on the off-road, a running resistance becomes great compared to the case of travelling on the on-road, thereby requiring greater driving force. Therefore, there has been known a vehicle provided with a transmission including a sub-transmission having a high-speed mode for travelling on the on-road and a low-speed mode for travelling on the off-road in which a reduction gear ratio is greater than that in the high-speed mode, whereby driving force from the driving source is transmitted to each driving wheel via this transmission. A driver driving the vehicle provided with this sub-transmission generally sets the sub-transmission to the low-speed mode upon travelling on the off-road for transmitting greater driving force to the vehicle body to thereby enhance running through performance of the vehicle.

In view of the above-mentioned circumstance, a traction control apparatus disclosed in the following patent document 1 is applied to the vehicle provided with such sub-transmission, wherein an allowable slip amount is set small when the sub-transmission is in the low-speed mode compared to the case where the sub-transmission is in the high-speed mode. By this configuration, the driving force is effectively transmitted to the vehicle body by setting the sub-transmission to the low-speed mode upon travelling on the off-road, thereby being capable of enhancing running through performance of the vehicle.

[Patent Document 1]

Japanese Laid-open Publication No. 2000-344083

The road condition of the off-road greatly varies depending upon the types of the off-road. When the road surface of the off-road has relatively great inequalities and relatively great surface roughness, for example, the road holding of a wheel is insufficient, so that a difference in wheel speeds of each driving wheel becomes great when each driving wheel is slipped. In this case, the allowable slip amount is preferably set rather small as described above.

On the other hand, in case where the road surface of the off-road has relatively small inequalities and relatively small surface roughness such as a sand ground, for example, the road holding of the wheel is satisfactory and is liable to be uniform. Accordingly, there may be the case where the difference in wheel speeds of each driving wheel can be maintained rather small when each driving wheel is slipped, even upon travelling on the off-road. In this case, the allowable slip amount is preferably set rather great even upon travelling on the off-road like the case upon travelling on the on-road.

However, the traction control apparatus disclosed in the above-mentioned publication teaches that, when the sub-transmission is set to the low-speed mode, the allowable slip amount is uniformly set rather small. Therefore, when a driver sets the sub-transmission to the low-speed in the case of travelling on the above-mentioned off-road having satisfactory road holding of a wheel such as a sand ground, efficiency for transmitting driving force to the vehicle body is reduced, thereby entailing a problem that the running through performance of the vehicle may be deteriorated.

SUMMARY OF THE INVENTION

An object of the present invention is to provide a traction control apparatus for a vehicle that can maintain satisfactory running through performance upon travelling on various types of off-road.

The feature of the present invention is that a traction control apparatus for a vehicle provided with slip ratio related amount obtaining means for obtaining a slip ratio related amount showing a degree of a slip of each driving wheel and braking force controlling means for exerting braking force on each driving wheel such that, in case where the vehicle is in a state to be driven and the slip ratio related amount of each driving wheel exceeds a predetermined allowable amount, the slip ratio related amount of each driving wheel is placed within the predetermined allowable amount, comprises wheel speed obtaining means for obtaining a wheel speed of each driving wheel, dispersion amount obtaining means for obtaining a wheel speed dispersion amount showing a degree of dispersion in the wheel speed of each driving wheel and allowable amount changing means for changing the predetermined allowable amount according to the wheel speed dispersion amount.

The phrase "slip ratio related amount" means here an amount showing a degree of a slip of each driving wheel. Specifically, it includes, for example, a slip ratio (a ratio of a value obtained by subtracting a vehicle body speed from a wheel speed to the vehicle body speed) and a slip amount (a value obtained by subtracting the vehicle body speed from the wheel speed), but not limited thereto. Further, the phrase "wheel speed dispersion amount" means here an amount showing a degree of a dispersion in the wheel speed of each driving wheel. Specifically, it includes, for example, a difference between the maximum value and the minimum value in the wheel speeds of each driving wheel and the sum of squares of deviations in the wheel speeds of each driving wheel from the average value of the wheel speeds of each wheel.

As explained before, the wheel speed dispersion amount (for example, a difference between the maximum value and the minimum value in the wheel speeds of each driving wheel) becomes great when each driving wheel is slipped in case where a vehicle travels on the off-road having a poor road holding of a wheel, so that the allowable slip amount is preferably set rather small. Further, the wheel speed dispersion amount is kept rather small when each driving wheel is slipped in case where a vehicle travels on the off-road having a satisfactory road holding of a wheel, so that the allowable slip amount is preferably set rather great. In other words, the road condition of the off-road can be discriminated according to the wheel speed dispersion amount of each driving wheel when each driving wheel is slipped, and the allowable slip amount is preferably changed according to the wheel speed dispersion amount.

Accordingly, if the above-mentioned predetermined allowable amount of the slip ratio related amount can be changed according to the wheel speed dispersion amount (for example, a difference between the maximum value and the minimum value in the wheel speeds of each driving wheel) showing the degree of dispersion in the wheel speed of each driving wheel like the above-mentioned construction, the predetermined allowable amount can be set small when the dispersion amount is great, while the predetermined allowable amount can be set great when the dispersion amount is small, for example. As a result, driving force can effectively be transmitted to the vehicle body upon travelling on various types of off-road in spite of travelling on the off-road having a satisfactory road holding of a wheel or on the off-road having a poor road holding of a wheel, thereby being capable of maintaining a satisfactory running through performance.

Specifically, the allowable amount changing means is preferably configured to set the predetermined allowable amount so as to be smaller when the wheel speed dispersion amount is not less than a predetermined amount, compared to the case where the wheel speed dispersion amount is less than the predetermined amount.

Another feature of the present invention is that, in case where the traction control apparatus for a vehicle is applied to a vehicle where driving force from a driving source is transmitted to each driving wheel via a transmission provided with a sub-transmission having at least a high-speed mode and a low-speed mode having a reduction gear ratio greater than that in the high-speed mode, the predetermined allowable amount is changed according to the wheel speed dispersion amount when the sub-transmission is in the low-speed mode. In this case, the allowable amount changing means is preferably configured to set the predetermined allowable amount so as to be smaller when the sub-transmission is in the low-speed mode and the wheel speed dispersion amount is not less than a predetermined amount, compared to the case where the sub-transmission is in the low-speed mode and the wheel speed dispersion amount is less than the predetermined amount.

As described above, a driver driving the vehicle provided with the sub-transmission generally sets the sub-transmission to the low-speed mode upon travelling on the off-road. Therefore, by setting the sub-transmission to the low-speed mode upon travelling on the various types of off-road in the above-mentioned construction, driving force can effectively be transmitted to the vehicle body upon travelling on the various types of off-road like the traction control apparatus according to the above-mentioned feature of the present invention, thereby being capable of maintaining satisfactory running through performance.

In this case, the allowable amount changing means is preferably configured to set the predetermined allowable amount so as to be smaller when the sub-transmission is in the low-speed mode and the wheel speed dispersion amount is not less than the predetermined amount, compared to the case where the sub-transmission is in the high-speed mode.

A driver driving the vehicle provided with the sub-transmission generally sets the sub-transmission to the high-speed mode upon travelling on the on-road. As described above, the wheel speed dispersion amount of each driving wheel can be kept rather small when each driving wheel is slipped upon travelling on the on-road, so that the allowable slip amount is preferably set to a rather great value.

Accordingly, if the predetermined allowable amount is set rather great like the above-mentioned construction when the sub-transmission is in the high-speed mode, compared to the case where the sub-transmission is in the low-speed mode and the wheel speed dispersion amount is not less than the predetermined amount, like the case where the sub-transmission is in the low-speed mode and the wheel speed dispersion amount is less than the predetermined amount, satisfactory running through performance can always be maintained even upon travelling on the on-road and various types of off-road by setting the sub-transmission to the low-speed mode upon travelling on the various types of off-road while setting the sub-transmission to the high-speed mode upon travelling on the on-road.

Further, the wheel speed dispersion amount obtained by the variation amount obtaining means is preferably a difference between the maximum value and the minimum value in the wheel speeds of each driving wheel in either one of the above-mentioned traction control apparatuses for the vehicle. The wheel speed dispersion amount can be obtained from a simple calculation by this setting.

DESCRIPTION OF THE PREFERRED EMBODIMENT

Figure 1:
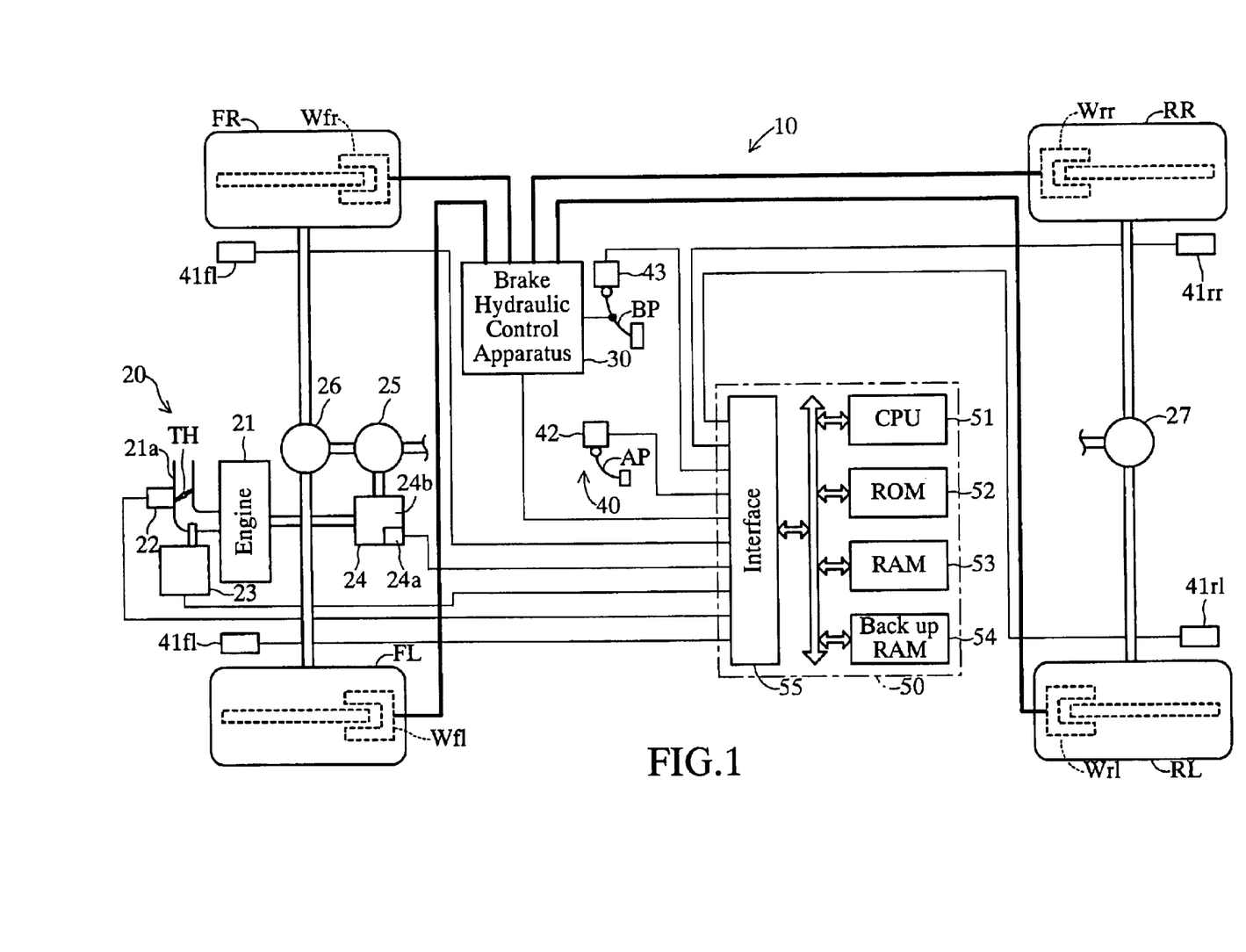
FIG. 1 is a schematic constructional view of a vehicle provided with a traction control apparatus for a vehicle according to an embodiment of the present invention.

A preferred embodiment of a traction control apparatus for a vehicle according to the present invention will be explained hereinbelow with reference to drawings. FIG. 1 shows a schematic construction of a vehicle provided with a traction control apparatus 10 according to the embodiment of the invention. This vehicle is a four-wheel drive vehicle using a four-wheel drive system and having two front wheels (front-left wheel FL and front-right wheel FR) that are driving wheels and two rear wheels (rear-left wheel RL and rear-right wheel RR) that are similarly driving wheels.

The traction control apparatus 10 for the vehicle is configured to include a driving force transmission section 20 that produces driving force and respectively transmits this driving force to each driving wheel FL, FR, RL and RR, a brake hydraulic control apparatus 30 for producing braking force by a brake fluid pressure on each wheel, a sensor section 40 composed of various sensors and an electrical control apparatus 50.

The driving force transmission section 20 is configured to include an engine 21 that produces driving force, a throttle valve actuator 22 arranged in an inlet pipe 21 a of the engine 21 and having a DC motor for controlling an opening of a throttle valve TH that can modulate the cross-sectional area of the inlet path, a fuel injection device 23 including an injector that injects fuel to the vicinity of an inlet port not shown of the engine 21, a transmission 24 whose input shaft is connected to an output shaft of the engine 21, a center differential gear 25 that suitably distributes and transmits driving force transmitted from the output shaft of the transmission 24 to a front-wheel-side driving system and a rear-wheel-side driving system, a front-wheel-side differential gear 26 that suitably distributes and transmits the front-wheel-side driving force transmitted from the front-wheel-side driving system to the front wheels FL and FR and a rear-wheel-side differential gear 27 that suitably distributes and transmits the rear-wheel-side driving force transmitted from the rear-wheel-side driving system to the rear wheels RR and RL. These various types of differentials gear 25 to 27 enable each wheel (driving wheel) FL, FR, RL and RR to rotate with a respectively different wheel speed under a predetermined relationship.

The transmission 24 is provided with a main transmission 24a having a plurality of shift positions each having a different reduction gear ratio and a sub-transmission 24b having a high-speed mode and a low-speed mode having a reduction gear ratio greater than that in the high-speed mode. The sub-transmission 24b is configured such that it is in the low-speed mode when the shift position thereof is in "L4", while it is in the high-speed mode when the shift position thereof is in "H4".

Accordingly, when the shift position of the sub-transmission 24b is in "L4", the reduction gear ratio of the transmission 24 as a whole becomes great compared to the case where the shift position is in "H4" under the condition that the shift position in each case of the main transmission 24a is the same. Therefore, greater driving force can be transmitted to the driving wheels FL, FR, RL and RR upon travelling with low speed. Further, the transmission 24 can detect the shift position of the sub-transmission 24b and output a signal showing the shift position of the sub-transmission 24b.

Figure 2:
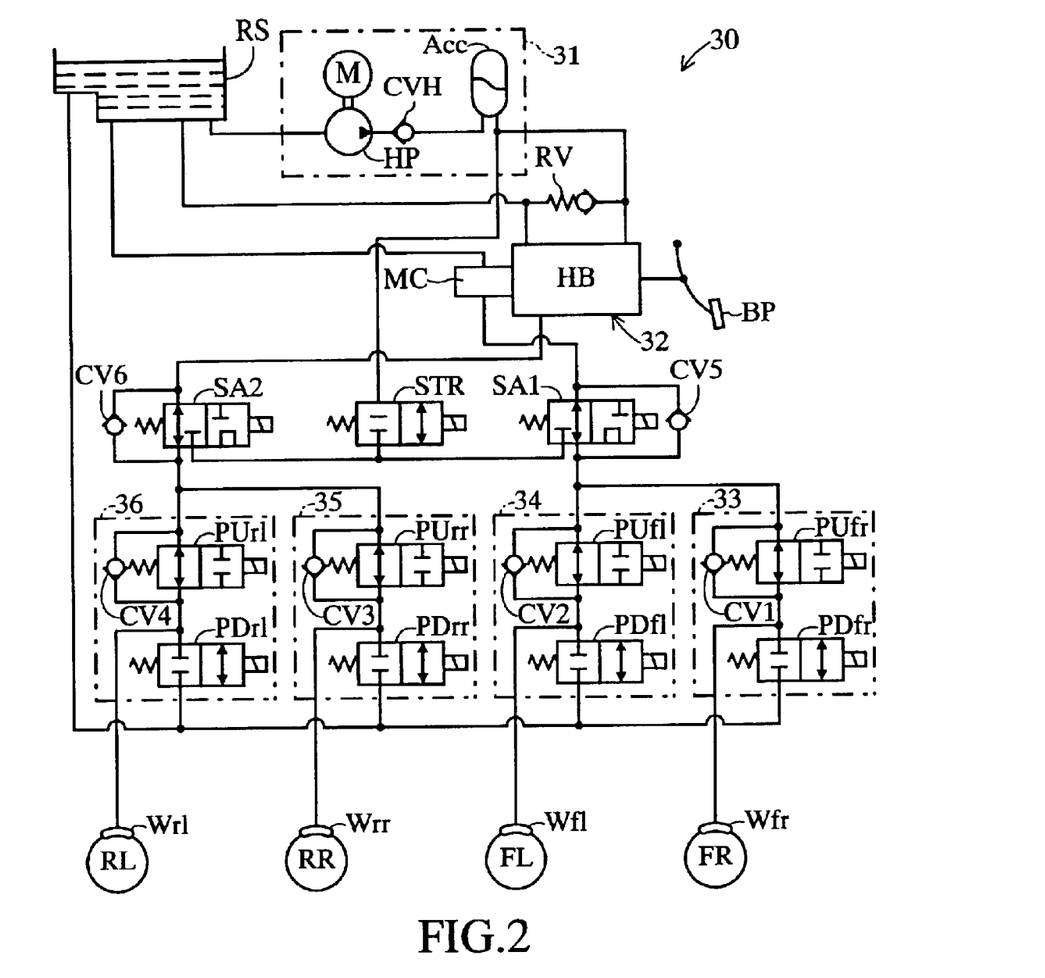
FIG. 2 is a schematic constructional view of a brake hydraulic control apparatus shown in FIG. 1.

The brake hydraulic control apparatus 30 whose construction is schematically shown in FIG. 2 is configured to include a high-pressure generating section 31, a brake fluid pressure generating section 32 that generates brake fluid pressure according to operating force on a brake pedal BP, and an FR brake fluid pressure adjusting section 33, an FL brake fluid pressure adjusting section 34, an RR brake fluid pressure adjusting section 35 and an RL brake fluid pressure adjusting section 36 that are capable of adjusting brake fluid pressure supplied respectively to wheel cylinders Wfr, Wfl, Wrr and Wrl each arranged at each wheel FR, FL, RR and RL.

The high-pressure generating section 31 is configured to include an electric motor M, a hydraulic pump HP driven by the electric motor M and pressurizing brake fluid in a reservoir RS and an accumulator Acc that is connected to the discharge side of the hydraulic pump HP via a check valve CVH and stores brake fluid pressurized by the hydraulic pump HP.

The electric motor M is driven when the fluid pressure in the accumulator Acc is less than a predetermined lower limit value, while it is halted when the fluid pressure in the accumulator Acc exceeds a predetermined upper limit value. By this, the fluid pressure in the accumulator Acc is always kept high within a predetermined range.

A relief valve RV is arranged between the accumulator Acc and the reservoir RS. When the fluid pressure in the accumulator Acc becomes extraordinarily higher than the above-mentioned high pressure, the brake fluid in the accumulator Acc is returned to the reservoir RS. This operation protects a hydraulic circuit in the high-pressure generating section 31.

The brake hydraulic generating section 32 is composed of a hydraulic booster HB that is driven according to the operation of the brake pedal BP and a master cylinder MC connected to the hydraulic booster HB. The hydraulic booster HB assists the operating force on the brake pedal BP at a predetermined ratio by utilizing the above-mentioned high pressure supplied from the high-pressure generating section 31 and transmits the assisted operating force to the master cylinder MC.

The master cylinder MC generates master cylinder fluid pressure according to the assisted operating force. Further, the hydraulic booster HB, by inputting this master cylinder fluid pressure, generates regulator fluid pressure that is approximately equal to the master cylinder fluid pressure according to the assisted operating force. The constructions and operations of the master cylinder MC and hydraulic booster HB are well known, so that their detailed explanations are omitted here. As described above, the master cylinder MC and hydraulic booster HB respectively generate master cylinder fluid pressure and regulator fluid pressure according to the operating force on the brake pedal BP.

A control valve SA1 that is a three-port two-position switching type solenoid-operated valve is arranged between the master cylinder MC and each of the upstream side of the FR brake fluid pressure adjusting section 33 and the upstream side of the FL brake fluid pressure adjusting section 34. Similarly, a control valve SA2 that is a three-port two-position switching type solenoid-operated valve is arranged between the hydraulic booster HB and each of the upstream side of the RR brake fluid pressure adjusting section 35 and the upstream side of the RL brake fluid pressure adjusting section 36. Further, a change-over valve STR that is a two-port two-position switching type, normally closed, solenoid-operated on-off valve is arranged between the high-pressure generating section 31 and each of the control valve SA1 and the control valve SA2.

When the control valve SA1 is in the first position in FIG. 2 (in the non-actuated position), it functions to establish communication between the master cylinder MC and each of the upstream section of the FR brake fluid pressure adjusting section 33 and the upstream section of the FL brake fluid pressure adjusting section 34. When in the second position (in the actuated position), it functions to cut off the communication between the master cylinder MC and each of the upstream section of the FR brake fluid pressure adjusting section 33 and the upstream section of the FL brake fluid pressure adjusting section 34, but establish the communication between the change-over valve STR and each of the upstream section of the FR brake fluid pressure adjusting section 33 and the upstream section of the FL brake fluid pressure adjusting section 34.

When the control valve SA2 is in the first position in FIG. 2 (in the non-actuated position), it functions to establish communication between the hydraulic booster HB and each of the upstream section of the RR brake fluid pressure adjusting section 35 and the upstream section of the RL brake fluid pressure adjusting section 36. When in the second position (in the actuated position), it functions to cut off the communication between the hydraulic booster HB and each of the upstream section of the RR brake fluid pressure adjusting section 35 and the upstream section of the RL brake fluid pressure adjusting section 36, but establish the communication between the change-over valve STR and each of the upstream section of the RR brake fluid pressure adjusting section 35 and the upstream section of the RL brake fluid pressure adjusting section 36.

By this operation, master cylinder fluid pressure is supplied to each of the upstream section of the FR brake fluid pressure adjusting section 33 and the upstream section of the FL brake fluid pressure adjusting section 34 when the control valve SA1 is placed at the first position, while high pressure generated from the high-pressure generating section 31 is supplied thereto when the control valve SA1 is placed at the second position and the change-over valve STR is placed at the second position (at the actuated position).

Similarly, regulator fluid pressure is supplied to each of the upstream section of the RR brake fluid pressure adjusting section 35 and the upstream section of the RL brake fluid pressure adjusting section 36 when the control valve SA2 is placed at the first position, while high pressure generated from the high-pressure generating section 31 is supplied thereto when the control valve SA2 is placed at the second position and the change-over valve STR is placed at the second position.

The FR brake fluid pressure adjusting section 33 is composed of a pressure increasing valve PUfr that is a two-port two-position switching type, normally opened, solenoid-operated on-off valve and a pressure reducing valve PDfr that is a two-port two-position switching type, normally closed, solenoid-operated on-off valve. The pressure increasing valve PUfr, when placed at the first position in FIG. 2 (at the non-actuated position), establishes a communication between the upstream section of the FR brake fluid pressure adjusting section 33 and the wheel cylinder Wfr, while it cuts off the communication between the upstream section of the FR brake fluid pressure adjusting section 33 and the wheel cylinder Wfr when placed at the second position (at the actuated position). The pressure reducing valve PDfr cuts off the communication between the wheel cylinder Wfr and the reservoir RS when it is placed at the first position in FIG. 2 (at the non-actuated position), while it establishes the communication between the wheel cylinder Wfr and the reservoir RS when placed at the second position (at the actuated position).

By this operation, the brake fluid pressure in the wheel cylinder Wfr is increased when the pressure increasing valve PUfr and the pressure reducing valve PDfr are placed at the first position since the fluid pressure at the upstream section of the FR brake fluid pressure adjusting section 33 is supplied into the wheel cylinder Wfr. When the pressure increasing valve PUfr is placed at the second position and the pressure reducing valve PDfr is placed at the first position, the brake fluid pressure in the wheel cylinder Wfr is kept to be the fluid pressure at the time in the wheel cylinder Wfr regardless of the fluid pressure at the upstream section of the FR brake fluid pressure adjusting section 33. When the pressure increasing valve PUfr and the pressure reducing valve PDfr are placed at the second position, the brake fluid pressure in the wheel cylinder Wfr is reduced since the brake fluid in the wheel cylinder Wfr is returned to the reservoir RS.

A check valve CV1 is arranged in parallel to the pressure increasing valve PUfr for allowing only one-way flow of the brake fluid from the wheel cylinder Wfr side to the upstream section of the FR brake fluid pressure adjusting section 33. This arrangement brings a rapid reduction of the brake fluid pressure in the wheel cylinder Wfr when the released brake pedal BP is opened with the control valve SA1 placed at the first position.

Similarly, the FL brake fluid pressure adjusting section 34, RR brake fluid pressure adjusting section 35 and RL brake fluid pressure adjusting section 36 are respectively composed of a pressure increasing valve PUfl and pressure reducing valve PDfl, a pressure increasing valve PUrr and pressure reducing valve PDrr and a pressure increasing valve PUrl and pressure reducing valve PDrl. The position of each pressure increasing valve and pressure reducing valve is controlled, whereby the brake fluid pressure in the wheel cylinder Wfl, wheel cylinder Wrr and wheel cylinder Wrl can be increased, kept and reduced. Further, check valves CV2, CV3 and CV4 that can attain the function same as that of the check valve CV1 are respectively arranged in parallel to the pressure increasing valves PUfl, PUrr and PUrl.

A check valve CV5 is arranged in parallel to the control valve SA1 for allowing only one-way flow of the brake fluid from the upstream side to the downstream side. When the control valve SA1 is placed at the second position and the communication between the master cylinder MC and each of the FR brake fluid pressure adjusting section 33 and the FL brake fluid pressure adjusting section 34 is cut off, the brake fluid pressure in the wheel cylinders Wfr and Wfl can be increased by operating the brake pedal BP. Further, arranged in parallel to the control valve SA2 is a check valve CV6 that can attain the function same as that of the check valve CV5.

By the construction described above, the brake hydraulic control apparatus 30 can supply brake fluid pressure according to the operating force on the brake pedal BP to each wheel cylinder when all the solenoid-operated valves are in the first position. Further, under this state, it can reduce, for example, only the brake fluid pressure in the wheel cylinder Wrr by a predetermined amount by controlling the pressure increasing valve PUrr and pressure reducing valve PDrr.

By changing the control valve SA1, change-over valve STR and pressure increasing valve PUfl to the second position and controlling the pressure increasing valve PUfr and pressure reducing valve PDfr respectively, the brake hydraulic control apparatus 30 can increase only the brake fluid pressure in the wheel cylinder Wfr by a predetermined value by utilizing the high pressure generated from the high-pressure generating section 31 while the brake fluid pressure in the wheel cylinder Wfl is maintained under a state where the brake pedal BP is not operated (is released). As described above, the brake hydraulic control apparatus 30 independently controls the brake fluid pressure in the wheel cylinder of each wheel regardless of the operation on the brake pedal BP, thereby being capable of exerting desired braking force on every independent wheel.

Referring again to FIG. 1, the sensor section 40 is composed of wheel speed sensors 41fl, 41fr, 41rl and 41rr each constructed by a rotary encoder that outputs a signal having a pulse every time each wheel FL, FR, RL and RR rotates at a predetermined angle, an accelerator opening sensor 42 that detects an operating amount of an accelerator pedal AP operated by a driver and outputs a signal showing the operating amount Accp of the accelerator pedal AP and a brake switch 43 that detects whether the brake pedal BP is operated or not by the driver for outputting a signal showing that the braking operation is performed or not.

The electrical control apparatus 50 is a microcomputer including a CPU 51, a ROM 52 that stores in advance a routine (program) executed by the CPU 51, table (look-up table, map), constant or the like, a RAM 53 to which the CPU 51 temporarily stores data as needed, a back-up RAM 54 that stores data with a power supply turned on and holds the stored data even during a period when the power supply is turned off and an interface 55 including an AD converter, those of which are connected to one another with a bus. The interface 55 is connected to the sensors 41 to 43 and transmission 24, thereby supplying to the CPU 51 signals from the sensors 41 to 43 and the signal showing the shift position of the sub-transmission 24b and transmitting a driving signal to each solenoid-operated valve and the motor M of the brake hydraulic control apparatus 30, the throttle valve actuator 22 and the fuel injection device 23 according to the instruction from the CPU 51.

By this operation, the throttle valve actuator 22 drives the throttle valve TH so as to obtain an opening thereof according to the operating amount Accp of the accelerator pedal AP, and the fuel injection device 23 injects fuel in a required amount so as to obtain a predetermined target air-fuel ratio (theoretical air-fuel ratio) concerning intake air mass according to the opening of the throttle valve TH.

[Outline of Traction Control for a Vehicle According to Invention]

The traction control apparatus 10 for a vehicle having the above-mentioned construction exerts predetermined braking force on each driving wheel FL, FR, RL and RR such that a slip ratio Sa of each driving wheel FL, FR, RL and RR described later as a slip ratio related amount is placed within an allowable slip ratio Ss (predetermined allowable amount) that is set and changed as described later, in case where the accelerator pedal AP is operated but the brake pedal BP is not operated (i.e., in a state that a vehicle is driven) and the slip ratio Sa of each driving wheel FL, FR, RL and RR exceeds the allowable slip ratio Ss.

The symbol "" marked at the end of the term "slip ratio Sa" is a comprehensive expression of "fl", "fr" or the like marked at the end of the term slip ratio Sa for showing which wheel is related to the slip ratio Sa. Specifically, the slip ratio Sa comprehensively represents the slip ratio Safl of the front-left wheel, the slip ratio Safr of the front-right wheel, the slip ratio Sarl of the rear-left wheel and the slip ratio Sarr of the rear-right wheel. The same explanation is made hereinbelow to the symbol "" marked at the end of other various variables, flags, codes or the like.

The allowable slip ratio Ss is desirably set to a suitable value such that driving force of the engine 21 is effectively transmitted to a vehicle body according to a state of a road condition on which a vehicle runs. In case where a vehicle travels on an on-road or on an off-road such as a sand ground having satisfactory and uniform contact performance to a wheel, a friction force between a tire of each driving wheel FR, FL, RL and RR and a road surface becomes uniform to thereby make a slip ratio Sa of each driving wheel approximately same. In other words, a difference Δ Vw (wheel speed dispersion amount) between the maximum value and the minimum value among the wheel speeds Vw of each driving wheel FL, FR, RL and RR is maintained low when each driving wheel FL, FR, RL and RR is slipped. In this case, setting the allowable slip ratio Ss to a relatively great value so as to uniformly produce a relatively great slip on each driving wheel FL, FR, RL and RR can effectively transmit driving force of the engine 21 to a vehicle body.

On the other hand, when the vehicle travels on the off-road having a poor road holding of a wheel, a part of the driving wheels FL, FR, RL and RR frequently separates from the road surface. Therefore, a part of the driving force of the engine 21 is used (consumed) for causing a slip of a driving wheel that is not grounded due to the operation of the differential gears 25 to 27. As a result, the driving force is hard to be transmitted to the grounded driving wheel that can transmit the driving force to the vehicle body. In other words, the driving force is hard to be effectively transmitted to the vehicle body with a state where a difference Δ Vw between the maximum value and the minimum value among the wheel speeds Vw** of each driving wheel FL, FR, RL and RR becomes large when each driving wheel FL, FR, RL and RR is slipped. In this case, setting the allowable slip ratio Ss to a rather small value exerts braking force on the driving wheel a little earlier after the driving wheel that is not grounded starts to slip, whereby great driving force is transmitted to the grounded driving wheel according to a degree that the slip amount (wheel speed) of the driving wheel that is not grounded is limited low, due to the operation of the differential gears 25 to 27. Consequently, the driving force is effectively transmitted to the vehicle body, and hence, satisfactory running through performance of the vehicle can be maintained.

A driver driving a vehicle provided with the sub-transmission 24b like a vehicle having mounted thereto the traction control apparatus 10 of the present embodiment generally sets the shift position of the sub-transmission 24b to "L4" upon travelling on the off-road for transmitting greater driving force to the vehicle body to thereby enhance running through performance of the vehicle.

Accordingly, The traction control apparatus 10 of the embodiment first obtains the slip ratios Sa of each of the driving wheels FL, FR, RL and RR from a following formula 1, wherein Vso is an estimated vehicle body speed estimated based upon each wheel speed Vw.

$$Sa^{}=(Vw^{}-Vso)/Vso \quad \text{[Formula 1]}$$

Subsequently, this apparatus determines whether the shift position of the sub-transmission 24b is in "L4" or not. If the shift position is in "L4", it obtains the difference Δ Vw between the maximum value and the minimum value among the wheel speeds Vw** of each driving wheel FL, FR, RL and RR, and then, determines whether the difference Δ Vw is not less than a wheel speed difference threshold value Vref (predetermined value, for example, 3 km/h) stored in advance in the ROM 52.

When the shift position of the sub-transmission 24b is in "H4", or the shift position of the sub-transmission 24b is in "L4" and the difference Δ Vw is less than the wheel speed difference threshold value Vref, the allowable slip ratio Ss is set to a constant value Shigh that is rather great. On the other hand, when the shift position of the sub-transmission 24b is in "L4" and the difference Δ Vw is not less than the wheel speed difference threshold value Vref, the allowable slip ratio Ss is set to a constant value Slow that is smaller than the constant value Shigh.

As described above, the apparatus changes the allowable slip ratio Ss in accordance with the shift position of the sub-transmission 24b and the difference value Δ Vw. That is the outline of the traction control for the vehicle according to the present invention.

[Actual Operation]

Figure 3:
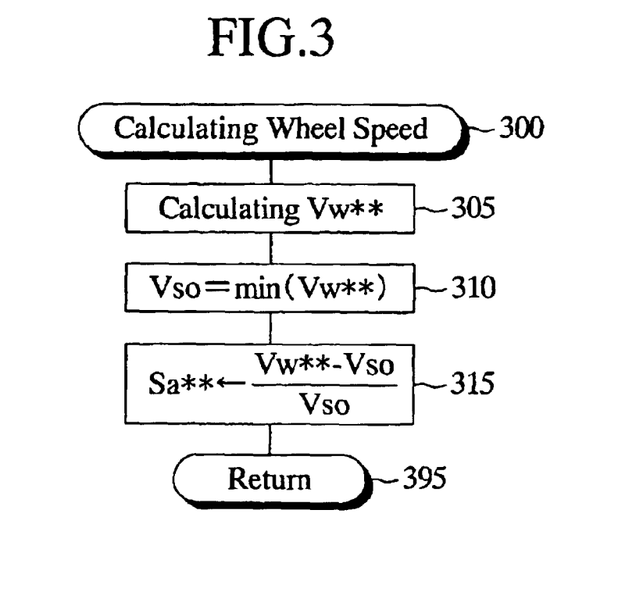
FIG. 3 is a flowchart showing a routine for calculating a wheel speed or the like executed by a CPU shown in FIG. 1.
Figure 4:
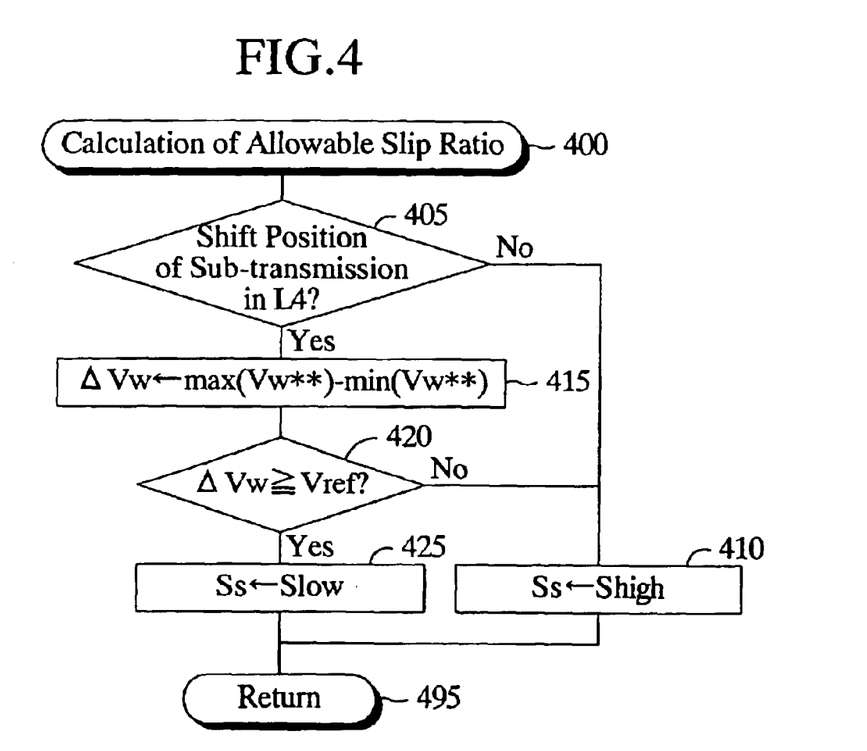
FIG. 4 is a flowchart showing a routine for calculating an allowable slip ratio executed by the CPU shown in FIG. 1.
Figure 5:
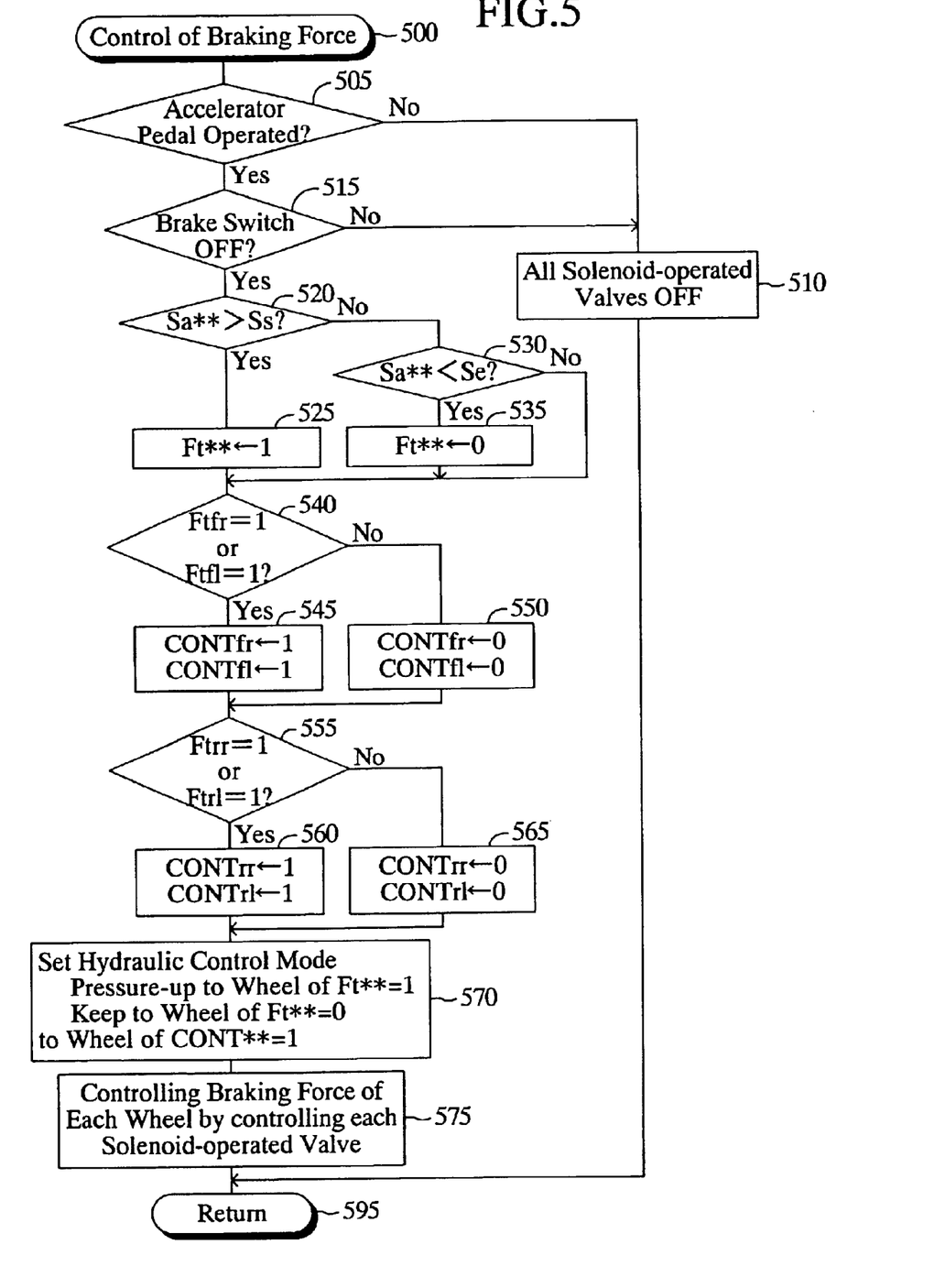
FIG. 5 is a flowchart showing a routine for controlling braking force exerted on each driving wheel executed by the CPU shown in FIG. 1.

Subsequently, the actual operation of the traction control apparatus 10 for a vehicle having the above-mentioned construction according to the present invention will be explained hereinbelow with reference to FIGS. 3 to 5 showing routines with flowcharts executed by the CPU 51 of the electrical control apparatus 50.

The CPU 51 repeatedly executes a routine shown in FIG. 3 for calculating the wheel speed Vw or the like once every predetermined period. Accordingly, the CPU 51 starts the process from a step 300 at a predetermined timing, and then proceeds to a step 305 to respectively calculate the wheel speed (outer circumferential speed of each wheel) Vw of each wheel FR or the like. Specifically, the CPU 51 respectively calculates the wheel speed Vw of each wheel FR or the like based upon an interval of a pulse possessed by the signal outputted from each wheel speed sensor 41. The step 305 corresponds to wheel speed obtaining means.

Next, the CPU 51 proceeds to a step 310 for calculating the minimum value among the wheel speeds Vw of each wheel FR or the like as the estimated vehicle body speed Vso. It is to be noted that the average value of the wheel speeds Vw of each wheel FR or the like may be calculated as the estimated vehicle body speed Vso.

Then, the CPU 51 proceeds to a step 315 for calculating the actual slip ratio Sa of every wheel based upon the estimated vehicle body speed Vso calculated at the step 310, the wheel speed values Vw of each wheel FR or the like calculated at the step 305 and the formula disclosed in the step 315 based upon the right side of the formula 1. Then, the CPU 51 moves to a step 395 to temporarily complete this routine. The step 315 corresponds to slip ratio related amount obtaining means.

Subsequently explained is the calculation of the allowable slip ratio. The CPU 51 repeatedly executes a routine shown in FIG. 4 once every predetermined period. Accordingly, the CPU 51 starts the process from a step 400 at a predetermined timing, and then proceeds to a step 405 to determine whether the shift position of the sub-transmission 24b is in "L4" or not based upon the signal outputted from the transmission 24. If the shift position of the sub-transmission 24b is not in "L4" (i.e., the shift position of the sub-transmission 24b is in "H4"), it makes "No" determination at the step 405 to proceed to a step 410 where the allowable slip ratio Ss is set to the constant value Shigh that is rather great. After that, the CPU 51 moves to a step 495 to temporarily complete this routine.

On the other hand, if the shift position of the sub-transmission 24b is in "L4" in the judgment at the step 405, the CPU 51 makes "Yes" determination at the step 405 to proceed to a step 415 for calculating the difference Δ Vw between the maximum value and the minimum value among the wheel speeds Vw** of each driving wheel FL, FR, RL and RR based upon the formula disclosed in the step 415. The step 415 corresponds to dispersion amount obtaining means.

Then, the CPU 51 proceeds to a step 420 for determining whether the difference value Δ Vw calculated at the step 415 is not less than the wheel speed difference threshold value Vref or not. If the difference value Δ Vw is not more than the wheel speed difference threshold value Vref (i.e., the difference value Δ Vw is less than the wheel speed difference threshold value Vref), the CPU 51 makes "No" determination at the step 420 to move to the step 410 where the allowable slip ratio Ss is set to the constant value Shigh that is rather great like the case where the shift position of the sub-transmission is in "H4". After that, the CPU 51 moves to the step 495 to temporarily complete this routine.

On the other hand, if the difference Δ Vw is not less than the wheel speed difference threshold value Vref in the judgment at the step 420, the CPU 51 makes "Yes" determination at the step 420 to move to the step 425 where the allowable slip ratio Ss is set to the constant value Slow that is smaller than the above-mentioned constant value Shigh. Then, the CPU 51 moves to the step 495 to temporarily complete this routine. The steps 420, 410 and 425 correspond to allowable amount changing means. As described above, the allowable slip ratio Ss is set.

Subsequently explained is the control of the braking force that should be exerted on each driving wheel. The CPU 51 repeatedly executes a routine shown in FIG. 5 once every predetermined period. Accordingly, the CPU 51 starts the process from a step 500 at a predetermined timing, and then proceeds to a step 505 to determine whether the accelerator pedal AP is operated or not. Specifically, the CPU 51 determines that the accelerator pedal AP is operated when the operating amount Accp of the accelerator pedal AP obtained from the accelerator opening sensor 42 is not less than a predetermined amount slightly greater than "0".

When the CPU 51 makes "Yes" determination at the step 505, it proceeds to a step 515 to determine whether the brake switch 43 is turned OFF (the brake pedal BP is not operated) or not based upon the signal obtained from the brake switch 43. If the brake switch 43 is turned OFF, the CPU 51 makes "Yes" determination at the step 515, then proceeds to a step 520 and the following steps to perform a process for executing the braking force control by the traction control. In other words, the process for executing the braking force control by the traction control is performed only when the accelerator pedal AP is operated as well as the brake switch 43 is turned OFF.

On the other hand, when the accelerator pedal AP is not operated or the brake switch 43 is turned ON, the vehicle is in a state not to be driven, so that it is unnecessary to execute the braking force control by the traction control. In this case, the CPU 51 makes "No" determination at either one of steps 505 and 515 to proceed to a step 510 for turning OFF (non-actuated state) all the solenoid-operated valves in the brake hydraulic control apparatus 30. After that, the CPU 51 moves to a step 595 to temporarily complete this routine.

The explanation is continued assuming that the accelerator pedal AP is operated and the brake switch 43 is turned OFF. The CPU 51 makes "Yes" determination at the step 505 and step 515 to proceed to the step 520 to determine every driving wheel whether or not the slip ratio Sa of each wheel FR or the like calculated at the step 315 in FIG. 3 is greater than the allowable slip ratio Ss set at the step 410 or step 425 in FIG. 4. When the slip ratio Sa of each wheel is greater than the allowable slip ratio Ss, the CPU 51 makes "Yes" determination at the step 520 to proceed to a step 525 for setting an allowable flag Ft** to "1", and then, moves to a step 540.

On the other hand, if the slip ratio Sa of each wheel FR or the like is not greater than the allowable slip ratio Ss, the CPU 51 makes "No" determination at the step 520 to proceed to a step 530 to determine every driving wheel whether or not the slip ratio Sa of each wheel is smaller than the slip ratio Se for judging the termination of the traction control. If the slip ratio Sa of each wheel is smaller than the slip ratio Se for judging the termination of the traction control, the CPU 51 makes "Yes" determination at the step 530 to proceed to a step 535 for setting the allowable flag Ft to "0", and then, moves to the step 540. If the slip ratio Sa of each wheel is not less than the slip ratio Se for judging the termination of the traction control, the CPU 51 makes "No" determination at the step 530, and then, moves to the step 540 while keeping the value of the allowable flag Ft to be the value at the time of the termination of the previous execution of this routine.

The value of the slip ratio Se for judging the termination of the traction control is smaller than the constant value Slow set at the step 425 in FIG. 4. Further, the allowable flag Ft** shows that the traction control is required to be executed to the corresponding wheel when the value thereof is "1", while it shows that the traction control does not have to be executed when the value thereof is "0".

By this, the value of the allowable flag Ft of the corresponding wheel is always set to "1" when the slip ratio Sa of each wheel is greater than the allowable slip ratio Ss, whereby the traction control is executed to the corresponding wheel by the process at a step 575 described later in the present execution of this routine. Further, when the slip ratio Sa of each wheel is smaller than the slip ratio Se for judging the termination of the traction control, the value of the allowable flag Ft of the corresponding wheel is always set to "0", whereby the traction control is not executed to the corresponding wheel by the process of the step 575 in the present execution of this routine.

When the slip ratio Sa of each wheel is not less than the slip ratio Se for judging the termination of the traction control as well as not more than the allowable slip ratio Ss, the allowable flag Ft of the corresponding wheel is kept to be the value at the time of the termination of the previous execution of this routine as described above. Therefore, if the value of the allowable flag Ft of the corresponding wheel is set to "1" at the time of the termination of the previous execution of this routine, the value of the allowable flag Ft of the corresponding wheel is also set to "1" even in the present execution of this routine, whereby the traction control is executed to the corresponding wheel by the process of the step 575 described later in the present execution of this routine. On the other hand, if the value of the allowable flag Ft of the corresponding wheel is set to "0" at the time of the termination of the previous execution of this routine, the value of the allowable flag Ft of the corresponding wheel is also set to "0" even in the present execution of this routine, whereby the traction control is not executed to the corresponding wheel by the process of the step 575 described later in the present execution of this routine.

The CPU 51 proceeds to the step 540 to determine whether or not at least one of the value of an allowable flag Ftfr of the wheel Fr at present and the value of an allowable flag Ftfl of the wheel Fl at present is "1". If at least one of the value of the allowable flag Ftfr of the wheel Fr at present and the value of the allowable flag Ftfl of the wheel Fl at present is "1", the CPU 51 makes "Yes" determination at the step 540 to proceed to the step 545 for setting values of a controlled wheel indicating flag CONTfr and a controlled wheel indicating flag CONTfl at the front-wheel side to "1", and then, moves to a step 555. On the other hand, if both of the value of the allowable flag Ftfr of the wheel Fr at present and the value of the allowable flag Ftfl of the wheel Fl at present are "0", the CPU 51 makes "No" determination at the step 540 to proceed to the step 550 for setting values of the controlled wheel indicating flag CONTfr and the controlled wheel indicating flag CONTfl at the front-wheel side to "0", and then, moves to the step 555.

The controlled wheel indicating flag CONT represents that the corresponding wheel is the wheel to be controlled when the value thereof is "1", while it represents that the corresponding wheel is not the wheel to be controlled when the value thereof is "0". The wheel to be controlled is a wheel wherein at least one of the corresponding pressure increasing valve PU and pressure reducing valve PD** shown in FIG. 2 is required to be controlled.

Accordingly, in case where, at present, the value of the allowable flag Ftfr is "1", the value of the allowable flag Ftfl is "0" and only the brake fluid pressure in the wheel cylinder Wfr of the front-right wheel FR of the front wheels FR and FL is required to be increased, for example, the control valve SA1, change-over valve STR and pressure increasing valve PUfl shown in FIG. 2 are switched over to the second position and the pressure increasing valve PUfr and the pressure reducing valve PDfr are respectively controlled, whereby only the brake fluid pressure in the wheel cylinder Wfr is increased by utilizing the high pressure generated from the high-pressure generating section 31 while keeping the brake fluid pressure in the wheel cylinder Wfl to be the fluid pressure at this time. Therefore, not only the front-right wheel FR but also the front-left wheel FL are included in the wheels to be controlled in this case.

The CPU 51 proceeds to the step 555 to perform at steps 555 to 565 the processes same as those performed at the steps 540 to 550. After setting the value of a controlled wheel indicating flag CONTrr and the value of a controlled wheel indicating flag CONTrl at the rear-wheel side to "1" or "0", the CPU 51 proceeds to a step 570 for setting a hydraulic control mode with respect to the wheel to be controlled every wheel to be controlled. Specifically, the CPU 51 sets the hydraulic control mode to "pressure-up" with respect to the wheel to be controlled having the value of "1" of the allowable flag Ft at present, while it sets the hydraulic mode to "keep" with respect to the wheel to be controlled having the value of "0" of the allowable flag Ft.

Subsequently, the CPU 51 proceeds to the step 575 where it controls the control valves SA1 and SA2 and the change-over valve STR shown in FIG. 2 based upon the hydraulic control mode set at the step 570 every wheel to be controlled and further it controls the pressure increasing valve PU and pressure reducing valve PD according to the hydraulic control mode every wheel to be controlled.

Specifically, the CPU 51 controls to set the corresponding pressure increasing valve PU and pressure reducing valve PD to the first position (position in the non-actuated state) with respect to the wheel to be controlled having the hydraulic control mode of "pressure-up", while it controls to set the corresponding pressure increasing valve PU to the second position (position in the actuated state) and the corresponding pressure reducing valve PD to the first position with respect to the wheel to be controlled having the hydraulic control mode of "keep".

This operation causes to increase only the brake fluid pressure in the wheel cylinder of the wheel to be controlled having the hydraulic control mode of "pressure-up" (i.e., in which the corresponding allowable flag Ft is "1"), resulting in achieving the traction control. The step 575** corresponds to braking force controlling means.

As described above, the traction control apparatus for a vehicle of the present invention sets the allowable slip ratio Ss to the constant value Shigh that is rather great, when the shift position of the sub-transmission 24b is in "H4", or the shift position of the sub-transmission 24b is in "L4" and the difference Δ Vw between the maximum value and the minimum value among the wheel speeds Vw of each driving wheel is less than the wheel speed difference threshold value Vref. On the other hand, when the shift position of the sub-transmission 24b is in "L4" and the difference Δ Vw is not less than the wheel speed difference threshold value Vref, the traction control apparatus for the vehicle of the present invention sets the allowable slip ratio Ss to the constant value Slow that is smaller than the constant value Shigh. Accordingly, by setting the shift position of the sub-transmission 24b to "L4" upon travelling on the various types of off-road, while by setting the shift position of the sub-transmission 24b** to "H4" upon travelling on the on-road, satisfactory running through performance can always be maintained even upon travelling on the on-road and on the various types of off-road.

The present invention is not limited to the above-mentioned embodiment, but can adapt various modifications within the scope of the invention. For example, although the allowable slip ratio value Ss set in case where the shift position of the sub-transmission is in "H4" and the allowable slip ratio value Ss set in case where the shift position of the sub-transmission 24b is in "L4" and the difference Δ Vw between the maximum value and the minimum value among the wheel speeds Vw** of each driving wheel is less than the wheel speed difference threshold value Vref are set to the same value of Shigh in the above-mentioned embodiment, these values may respectively be set to different values greater than the constant value Slow.

Although the slip ratio Se for judging the termination of the traction control is set to a constant value in the above-mentioned embodiment, the slip ratio Se for judging the termination of the traction control may be set to different values between the case where the allowable slip ratio Ss is set to the constant value Slow and the case where the allowable slip ratio Ss is set to the constant value Shigh. In this case, the slip ratio Se for judging the termination of the traction control is preferably set such that the value thereof set in case where the allowable slip ratio Ss is set to the constant value Slow is smaller than the value thereof in case where the allowable slip ratio Ss is set to the constant value Shigh.

Although the traction control apparatus for a vehicle according to the present invention is mounted on a four-wheel drive vehicle in the above-mentioned embodiment, it may be mounted on a front-wheel drive vehicle or a rear-wheel drive vehicle. In this case, Δ Vw between the maximum value and the minimum value among the wheel speeds Vw of each driving wheel calculated at the step 415 in FIG. 4 is calculated as the difference between the greater value and the smaller value of each wheel speed of two driving wheels.

Although the traction control is achieved only by exerting braking force on each driving wheel in the above-mentioned embodiment, it may be achieved by utilizing together reducing in driving force of the driving source (engine 21) under a predetermined condition. Specifically, the apparatus of the invention may be constructed such that, when all the slip ratios Sa of each driving wheel FL, FR, RL and RR are greater than the allowable slip ratio Ss by a predetermined value, braking force is exerted on all the driving wheels FL, FR, RL and RR and the throttle valve actuator 22 is controlled so as to make the throttle valve TH have an opening smaller by a predetermined amount than the opening according to the operating amount Accp of the accelerator pedal AP in order to decrease the driving force of the engine 21**.

What is claimed is:

1. A traction control apparatus for a vehicle provided with slip ratio related amount obtaining means for obtaining respective slip ratio related amounts showing respective degrees of slip for driving wheels and braking force controlling means for exerting braking force for traction control on the driving wheel when a slip ratio related amount exceeds a predetermined allowable slip ratio related amount, the predetermined allowable slip ratio related amount is common to all of the driving wheels and is used to determined whether the traction control should be initiated or not when the vehicle is in a state to be driven, such that the slip ratio related amount of the driving wheel is placed within the predetermined allowable slip ratio related amount, the traction control apparatus comprising:

wheel speed obtaining means for obtaining respective wheel speeds of plural driving wheels;

dispersion amount obtaining means for obtaining a wheel speed dispersion amount showing a degree of dispersion in the wheel speeds of the plural driving wheels based on a comparison result with respect to the wheel speeds of the plural driving wheels; and allowable slip ratio related amount changing means for changing the predetermined allowable slip ratio related amount according to the wheel speed dispersion amount.

2. A traction control apparatus claimed in claim 1, wherein the allowable slip ratio related amount changing means is configured to set the predetermined allowable slip ratio related amount so as to be smaller when the wheel speed dispersion amount is not less than a predetermined dispersion amount, compared to the case where the wheel speed dispersion amount is less than the predetermined dispersion amount.

3. A traction control apparatus claimed in claim 2, wherein the wheel speed dispersion amount obtained by the dispersion amount obtaining means is a difference between the maximum value and the minimum value among the wheel speeds of the plural driving wheels.

4. A traction control apparatus for a vehicle that is applied to a vehicle where driving force from a driving source is transmitted to each driving wheel via a transmission provided with a sub-transmission having at least a high-speed mode and a low-speed mode having a reduction gear ratio greater than that in the high-speed mode and is provided with slip ratio related amount obtaining means for obtaining respective slip ratio related amounts showing respective degrees of slip for driving wheels and braking force controlling means for exerting braking force for traction control on the driving wheel when the slip ratio related amount exceeds a predetermined allowable slip ratio related amount, the predetermined allowable slip ratio related amount is common to all of the driving wheels and is used to determine whether the traction control should be initiated or not when the vehicle is in a state to be driven, such that the slip ratio related amount of the driving wheel is placed within the predetermined allowable slip ratio related amount, the traction control apparatus comprising:

- wheel speed obtaining means for obtaining respective wheel speeds of plural driving wheels;
- dispersion amount obtaining means for obtaining a wheel speed dispersion amount showing a degree of dispersion in the wheel speeds of the plural driving wheels based on a comparison result with respect to the wheel speeds of the plural driving wheels; and
- allowable slip ratio related amount changing means for changing the predetermined allowable slip ratio related amount according to the wheel speed dispersion amount only when the sub-transmission is in the low-speed mode.

5. A traction control apparatus claimed in claim 4, wherein the allowable slip ratio related amount changing means is configured to set the predetermined allowable slip ratio related amount so as to be smaller when the sub-transmission is in the low-speed mode and the wheel speed dispersion amount is not less than a predetermined dispersion amount, compared to the case where the sub-transmission is in the low-speed mode and the wheel speed dispersion amount is less than the predetermined dispersion amount.

6. A traction control apparatus claimed in claim 5, wherein the allowable amount slip ratio related changing means is configured to set the predetermined allowable slip ratio related amount so as to be smaller when the sub-transmission is in the low-speed mode and the wheel speed dispersion amount is not less than the predetermined dispersion amount, compared to the case where the sub-transmission is in the high-speed mode.

7. A traction control apparatus claimed in claim 1, wherein the wheel speed dispersion amount obtained by the dispersion amount obtaining means is a difference between the maximum value and the minimum value among the wheel speeds of the plural driving wheels.

8. A traction control apparatus claimed in claim 6, wherein the wheel speed dispersion amount obtained by the dispersion amount obtaining means is a difference between the maximum value and the minimum value among the wheel speeds of the plural driving wheels.

9. A traction control apparatus claimed in claim 5, wherein the wheel speed dispersion amount obtained by the dispersion amount obtaining means is a difference between the maximum value and the minimum value among the wheel speeds of the plural driving wheels.

10. A traction control apparatus claimed in claim 4, wherein the wheel speed dispersion amount obtained by the dispersion amount obtaining means is a difference between the maximum value and the minimum value among the wheel speeds of the plural driving wheels.

* * * * *